INVENTORS.
KLAUS THOESE
MARKUS SEIBEL

ATTORNEY

United States Patent Office 3,505,264
Patented Apr. 7, 1970

3,505,264
PROCESS FOR THE MANUFACTURE OF HYDROPHILIC POLYVINYL ALCOHOL LAYERS
Klaus Thoese, Wiesbaden-Schierstein, and Markus Seibel, Mainz, Germany, assignors to Kalle Aktiengesellschaft, Wiesbaden-Biebrich, Germany, a corporation of Germany
Filed Feb. 14, 1966, Ser. No. 527,229
Claims priority, application Germany, Feb. 15, 1965, K 55,279
Int. Cl. C08f 29/30, 29/50
U.S. Cl. 260—29.6                                 6 Claims

ABSTRACT OF THE DISCLOSURE

This invention relates to a process for preparing hydrophilic polyvinyl alcohol layers which comprises applying to a support a coating comprising a dispersion of polymeric vinyl acetate in admixture with an aqueous polyvinyl alcohol solution containing at least one cross-linking agent but no softening agent, the polyvinyl alcohol having not more than 12 percent of unsaponified ester groups, and drying the coating.

---

Figure 1:
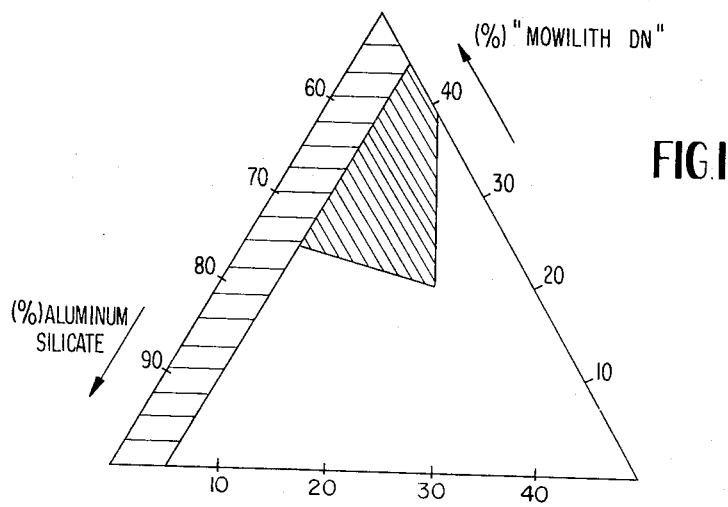

It is known that substances are distributed more uniformly in layers of hydrophilic colloids, e.g. gelatin, polyvinyl alcohol, cellulose derivatives or casein, applied to supports if the substances, in the form of aqueous solutions are incorporated by diffusion into the preformed colloid layers. This process is superior to the method in which the substances are coated onto the supports together with the hydrophilic colloid and, if desired, a pigment.

The aforementioned working methods are of technical interest and find wide use in practice for reproduction purposes, e.g. for sensitizing hydrophilic layers with light-sensitive or heat-sensitive substances. Since for reproduction purposes uniformly sensitized layers are of particular importance, preference is given to sensitizing the preformed colloid layer according to the diffusion method.

According to known methods, long curing times or high temperatures are required to cure the layers containing polyvinyl alcohol. Disadvantages result therefrom, such as shrinkage of the layers or of the supporting webs.

It has now been found that water-insoluble hydrophilic polyvinyl alcohol layers, e.g. pigmented layers in which polyvinyl alcohol is a binding agent, can be obtained readily and at comparatively moderate temperatures with the use of known cross-linking substances. In the process of the present invention, aqueous polyvinyl alcohol solutions with not more than 12 percent of unsaponified ester groups and containing cross-linking agents but no softening agents are used for the formation of the layer, dispersions of homopolymers and/or copolymers of vinyl acetate being added thereto, preferably those containing polyvinyl alcohol as a protective colloid.

If such dispersions of polyvinyl acetate, or one of its copolymers, containing polyvinyl alcohol as a protective colloid are added to the polyvinyl alcohol solutions containing cross-linking agents and coatings prepared therefrom are applied to supports, the properties of the dry coatings are superior to those of coatings prepared from polyvinyl alcohol solutions with the addition of polyvinyl acetate dispersions without polyvinyl alcohol as a protective colloid, particularly as regards the degree of water-insolubility.

In accordance with the present invention, the insoluble polyvinyl alcohol layers are prepared by mixing aqueous solutions of polyvinyl acetate, in which at least 88 percent of the ester groups are hydrolyzed (K value equal to or greater than 30), with a large portion of a pigment stirred to a paste in water, e.g. pigments such as clay, silicates or $TiO_2$ and, if desired, pigment dyes; a polyvinyl acetate dispersion, being the third component, is added to the mixture. The mixing ratios may vary widely, depending upon the required properties of the layers. As the mixing diagrams of the drawings show, optimum mixtures are in a typical zone, depending on the type of polyvinyl alcohol used, which does not contain more than 12 percent of nonhydrolyzed ester groups.

Figure 2:
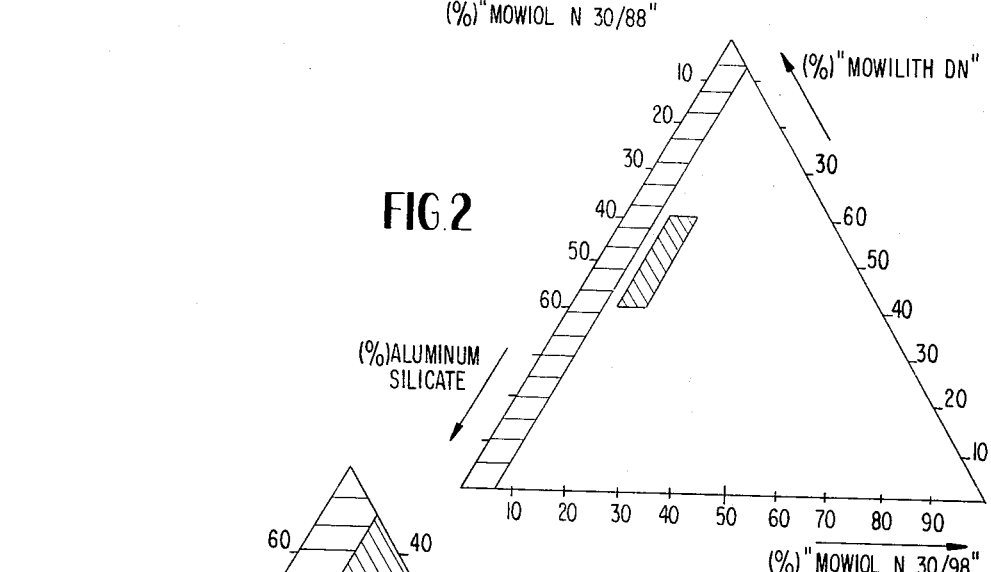
Figure 3:
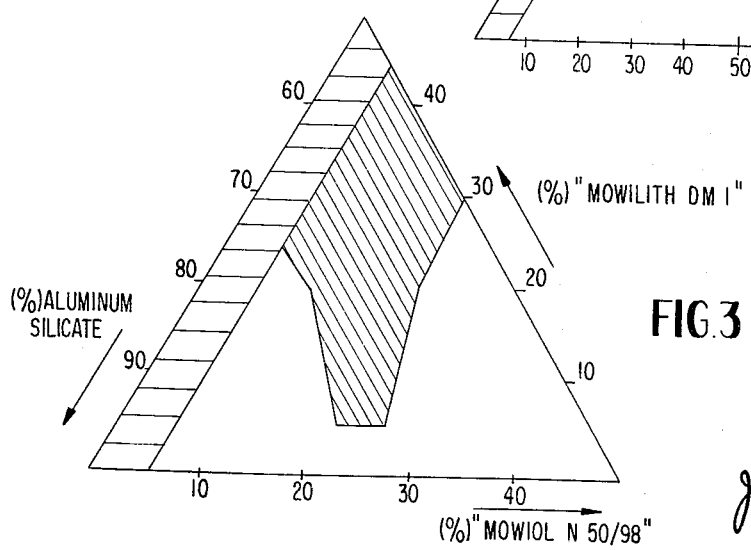

FIGURES 1 to 3 show the zones of cured samples using two different types of vinyl acetate dispersion and three different types of polyvinyl alcohol.

Polyvinyl alcohols suitable for the purpose of the invention, i.e. products manufactured by saponifying polyvinyl acetate and containing not more than 12 percent of unsaponified ester groups, are commercially available, e.g. under the name "Mowiol." Polyvinyl acetate dispersions of the type preferred for use in the present invention are commercially available under the name "Mowilith," for example.

As cross-linking agents for the polyvinyl alcohol portion of the dispersion there may be used commercial precondensates of urea-formaldehyde and/or melamine-formaldehyde, or suitable aldehydes and acids acting as curing catalysts are added in known manner. The pH value of the dispersions used in the present invention thus is in the acid range; preferably it is below 4.

The curing time and the curing temperature of the coating depend upon the amount applied. Up to a layer thickness of approximately $10\mu$, curing is effected within 10 to 20 seconds at a film surface temperature of 120–130° C.

The layers prepared in accordance with the present invention are more or less hydrophilic, depending upon their composition, and can be sensitized by diffusion using aqueous solutions of light-sensitive or heat-sensitive substances, but are insoluble in water, dilute alkalis or acids and solvents.

Where the coatings of the present invention are applied to webs made of plastic materials, e.g. films from cellulose acetate, polyethylene terephthalate or polycarbonate, it is advantageous, for anchoring the films, to provide them with a thin precoat of a commercial polyurethane adhesive. The coatings of the present invention adhere to webs of paper without any adhesive being necessary.

The insoluble hydrophilic coatings have a high permeability to gases or vapors as well as good absorptive properties, particularly with regard to aqueous solutions. An advantageous effect of the manufacture is that, by the addition of the dispersed polymer and/or copolymer of vinyl acetate, the viscosity of the aqueous coating dispersion is low and curing is effected after a short time. For the preparation of the coating, higher concentrations may be applied using rapidly operating coating machines, which is particularly economical.

The invention will be further illustrated by reference to the following specific examples:

EXAMPLE 1

Layers of approximately $10\mu$ thickness were poured onto $40\mu$ thick films of polyethylene terephthalate having an approximately $2\mu$ thick adhesive layer of polyurethane, e.g. the product commercially available under the name "Ultraflex." The mixing ratios of FIGURE 1 consisted of saponified polyvinyl acetate with not more than 12 percent unsaponified ester groups, e.g. the commercial product "Mowiol N 30/88," (polyvinyl alcohol having a Fikentscher K-value of 30, the latter being a measure of viscosity and molecular weight, and being 88 percent saponified, i.e., the polymer contains 12 percent of nonhydrolyzed ester groups) aluminum silicate pigment, and polyvinyl acetate dispersion with polyvinyl alcohol as a protective colloid, e.g. the commercial product "Mowilith DN" (an aqueous dispersion containing about 50 percent of vinyl acetate homopolymer having a particle size of 1 to 3µ and a viscosity of 10 to 50 poises at 20° C. The pH value of the dispersion is between 3 and 5). The layers were dried in a drying chamber for 2 minutes at temperatures up to 140° C. These drying conditions correspond to drying or curing for 15 seconds in production equipment, the film having a surface temperature of 125° C. The pigment was ground for 12 hours in a ball mill. 5 percent by weight of dimethylol urea, calculated on the "Mowiol," was used as the curing agent and the pH of the dispersion was adjusted to 3 to 4 by adding hydrochloric acid.

The solubility of the layers was tested by wiping them over with a 1.2 percent by weight sodium triphosphate solution (pH value 11). According to this test, the cured samples are insoluble in sodium triphosphate solution.

The zone of the cured samples is shown hatched in FIGURE 1 of the drawing. Mixtures with less than 5 percent by weight "Mowiol" were not tested since they are not sufficiently hydrophilic.

EXAMPLE 2

The same procedure was followed as in Example 1. The polyvinyl alcohol used was the commercial product "Mowiol N 30/98" (polyvinyl alcohol having a K-value of 30 and containing 2 percent of non-hydrolyzed ester groups).

The indications in the mixing diagram of FIGURE 2 of the drawings correspond to those of Example 1. The cured layers were insoluble in a 1.2 percent by weight sodium triphosphate solution.

EXAMPLE 3

The same procedure was followed as in Example 1. The polyvinyl alcohol used was the commercial product "Mowiol N 50/98" (polyvinyl alcohol having a K-value of 50 and containing 2 percent of non-hydrolyzed ester groups). The polyvinyl acetate dispersion employed was "Mowilith DM 1" (a dispersion containing about 55 percent of vinyl acetate copolymer having a particle size of 0.3 to 2µ, a viscosity of 5 to 25 poises at 20° C., and a pH value of about 4 to 5). The indications in the mixing diagram of FIGURE 3 of the drawings correspond to those of Example 1.

It will be obvious to those skilled in the art that many modifications may be made within the scope of the present invention without departing from the spirit thereof, and the invention includes all such modifications.

What is claimed is:

1. A process for preparing a hydrophilic polyvinyl alcohol layer which comprises applying to a support a coating comprising a dispersion of homopolymeric vinyl acetate in admixture with an aqueous polyvinyl alcohol solution containing at least one cross-linking agent selected from the group consisting of precondensates of urea-formaldehyde and melamine-formaldehyde but no softening agent, the polyvinyl alcohol having not more than 12 percent of unsaponified ester groups and being present in a quantity in the range of about 5 to 25 percent of total solids, and drying the coating.

2. A process according to claim 1 in which the coating contains a pigment.

3. A process according to claim 1 in which the dispersion of polymeric vinyl acetate contains polyvinyl alcohol as a protective colloid.

4. A process according to claim 1 in which the coating contains an aluminum silicate pigment.

5. An insoluble hydrophilic layer prepared by applying to a support a coating comprising a dispersion of homopolymeric vinyl acetate in admixture with an aqueous polyvinyl alcohol solution containing at least one cross-linking agent selected from the group consisting of precondensates of urea-formaldehyde and melamine-formaldehyde but no softening agent, the polyvinyl alcohol having not more than 12 percent of unsaponified ester groups and being present in a quantity in the range of about 5 to 20 percent of total solids, and drying the coating.

6. A material for use in preparing a hydrophilic polyvinyl alcohol layer comprising a dispersion of homopolymeric vinyl acetate in admixture with an aqueous polyvinyl alcohol solution containing at least one cross-linking agent selected from the group consisting of precondensates of urea-formaldehyde and melamine-formaldehyde but no softening agent, the polyvinyl alcohol having not more than 12 percent of unsaponified ester groups and being present in a quantity of about 5 to 20 percent of total solids.

References Cited

UNITED STATES PATENTS

| 2,773,050 | 12/1956 | Caldwell et al. | |
| 2,510,257 | 6/1950 | Robinson | 260—29.6 |
| 2,614,087 | 10/1952 | Turnbull | 260—29.6 |
| 3,197,429 | 7/1965 | Boatz | 260—29.6 |
| 3,298,987 | 1/1967 | Colgan et al. | 260—29.6 |

MURRAY TILLMAN, Primary Examiner

H. ROBERTS, Assistant Examiner

U.S. Cl. X.R.

260—91.3, 85.7, 89.1, 41, 874; 117—72, 155, 161